Patented July 3, 1923.

1,460,690

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.      Application filed April 30, 1921.   Serial No. 465,931.

*To all whom it may concern:*

Be it known that I, WILLIAM R. WEBB, a citizen of the United States of America, residing at Rochester, in the county of Monroe and State of New York, have invented certain new and useful Improvements in Cellulose-Ether Compositions, of which the following is a full, clear, and exact specification.

This invention relates to new compositions of matter in which cellulose ethers are mixed with other substances so that the resulting product can be advantageously used in the plastic and analogous arts, such, for instance, as sheet or film manufacture and varnish manufacture.

One object of my invention is to provide a composition which may be made into permanently transparent, strong and flexible sheets, films, or moulded articles which possess the desired properties in the plastic arts. Further objects will hereinafter appear.

I have discovered that a composition of matter having the properties desired in the film making and other plastic arts can be obtained by mixing or compounding cellulose ether, say of the type indicated in U. S. Patent No. 1,188,376, Lilienfeld, June 20, 1916, with aromatic side chain alcohols and their homologues and simple substitution products. The phenyl side chain alcohols having 1 or 2 carbon atoms in the side chain are individual solvents by themselves of the cellulose ether, but they, like the other substances in the above mentioned groups, may also be employed in conjunction with other compounds, as will be apparent to those skilled in the art.

The following substances may be mentioned as typical examples of the aromatic side chain alcohols which I may employ in exercising my invention,—benzyl alcohol, phenyl ethyl alcohol.

I may dissolve, by way of illustration, cellulose ethers, like water-insoluble ethyl cellulose, in benzyl alcohol until a strong, viscous, homogeneous solution is obtained, say 1 part of the ether to form 4 to 6 parts of the alcohol. Benzyl alcohol, as indicated by its high boiling point, has a relatively small volatility and consequently film formed from a plain solution of ether in it cures rather slowly. In order to facilitate a rapid setting of the film under manufacturing conditions, I may use more volatile substances as a vehicle in which to carry the other ingredients.

For instance, I may dissolve 100 parts by weight of cellulose ether in a mixture containing from 200 to 300 parts of benzyl alcohol and from 200 to 300 parts of methyl alcohol. Many other equivalent ingredients or vehicles may be substituted, such, for instance, as other lower monohydroxy aliphatic alcohols.

The resultant solution is usefully viscous so as to be flowable during film manufacture, the volatile vehicle passing away, but not too rapidly to impair the product.

Other substances which impart useful qualities to the film may be added, if desired, such for instance, as triphenyl or tricresyl phosphate, camphor, monochlornaphthalene, etc., but these are not indispensable, because a good film is yielded when the side chain alcohols are employed as the only low volatile parts of the mixture. The ingredients are of the commercial type and are sufficiently purified for the process of film manufacture, so as to give a dope yielding films having the proper relative freedom from color.

Having thus described my invention, what I claim as new and desire to secure by Letters Patent is:

1. A composition of matter comprising cellulose ether and an aromatic side chain alcohol.

2. A composition of matter comprising cellulose ether and an aromatic side chain alcohol, in which the side chain contains less than 3 carbon atoms.

3. A composition of matter comprising ehtyl cellulose and an aromatic side chain alcohol.

4. A composition of matter comprising ethyl cellulose and an aromatic side chain alcohol, in which the side chain contains less than 3 carbon atoms.

5. A composition of matter comprising cellulose ether and a member of the group of benzyl alcohol and its homologues.

6. A composition of matter comprising ethyl cellulose and a member of the group of benzyl alcohol, and its homologues.

7. A flowable, film-forming composition of matter comprising cellulose ether, an aromatic side chain alcohol, and a volatile vehicle carrying such ingredients.

8. A composition of matter comprising cellulose ether, a member of the group of benzyl alcohol, and its homologues, and a volatile common solvent.

9. A composition of matter comprising ethyl cellulose, a phenyl side chain alcohol containing less than 3 carbon atoms in the side chain and a lower monohydroxy aliphatic alcohol.

10. A composition of matter comprising water-insoluble ethyl cellulose, benzyl alcohol and methyl alcohol.

11. As an article of manufacture, a deposited or flowed film, comprising a cellulose ether and an aromatic side chain alcohol.

12. As an article of manufacture, a deposited or flowed flexible film comprising cellulose ether and a member of the group of benzyl alcohol and its homologues.

13. As an article of manufacture, a deposited or flowed flexible transparent film, comprising an alkyl ether of cellulose and a phenyl side chain alcohol containing less than 3 carbon atoms in the side chain.

14. As an article of manufacture, a deposited or flowed flexible transparent film, comprising water-insoluble ethyl cellulose and benzyl alcohol.

Signed at Rochester, New York, this 21st day of April 1921.

WILLIAM R. WEBB.